Dec. 19, 1961 J. B. McLEAN 3,014,091
COLOR AND INTENSITY LIGHT MODULATOR
Filed Jan. 28, 1960 2 Sheets-Sheet 1

INVENTOR.
JOHN B. MC LEAN
BY Wade Koontz
ATTORNEY and
Richard J. Killoren
AGENT

COLOR AND INTENSITY LIGHT MODULATOR

Filed Jan. 28, 1960 2 Sheets-Sheet 2

INVENTOR.
JOHN B. MC LEAN
BY Wade Koontz
ATTORNEY
and
Richard J. Killoren
AGENT 3,014,091

COLOR AND INTENSITY LIGHT MODULATOR

John B. McLean, Scotch Plains, N.J., assignor to the United States of America as represented by the Secretary of the Air Force Filed Jan. 28, 1960, Ser. No. 5,320
5 Claims. (Cl. 178—7.86)
(Granted under Title 35, U.S. Code (1952), sec. 266)

The invention described herein may be manufactured and used by or for the United States Government for governmental purposes without payment to me of any royalty thereon.

This invention relates to a device for producing light which varies in color and intensity in response to the signal applied to the horizontal and vertical deflection plates of a cathode ray tube.

One object of the invention is to provide a light source which is capable of producing light that varies in color in response to an input signal on one of the deflection plates of a cathode ray tube.

Another object is to provide a light source that is capable of producing light which varies in intensity in response to an input signal on one of the deflection plates of a cathode ray tube.

These and other objects will be more fully understood from the following detailed description taken with the drawing, wherein.

When recording upon film a mask with either a slit or a pinhole therein is located in front of the film and the horizontal position of the cathode ray spot produces the signal information on the film and the movement of the film causes the information to be recorded on the film in the direction perpendicular to the motion of the spot. The vertical sweep of the beam is therefore unnecessary.

Since it is sometimes desirable to distinguish targets at different ranges, according to this invention, by the use of an astigmatic lens, the horizontal position of the spot is preserved while a defocused beam of light in the vertical direction illuminates the mask. This makes the intensity of the light beam in the slit substantially independent of the vertical position of the cathode ray beam. With a mask having different color strips arranged in the vertical direction, placed over the face of the cathode ray tube and with a range signal applied to one of the cathode ray tube deflection plates, and the received signal applied to the other plates, the signal on the film will be an image whose color and position are proportional to received signal and range respectively.

It is obvious that other modifications could be used, for example, by applying an azimuth signal possibly monopulse radar data, to the vertical deflection plates, the position of the beam will represent range and color the azimuth.

Figure 1:
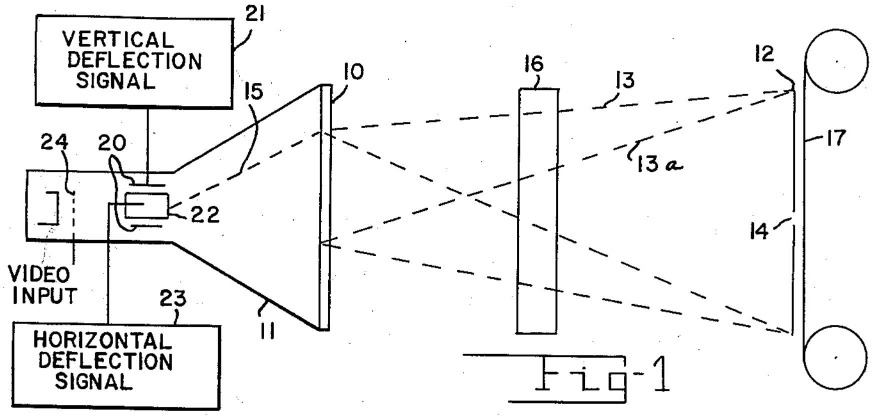
FIG. 1 is a color modulator according to the invention showing the light pattern in one of two perpendicular directions.
Figure 3:
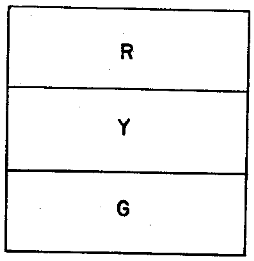
FIG. 3 shows the color mask used with the device of FIG. 1.

Referring more particularly to FIG. 1 of the drawing, a color mask 10, shown in greater detail in FIG. 3, is placed over the face of a cathode ray tube 11. The mask 10 has a plurality of different color filters as shown in FIG. 3. Though only three colors are shown, many different colors could be used and in some cases all of the colors of the spectrum might be desirable. The light from the cathode ray tube illuminates a mask 12 in the vertical direction with a defocused beam 13. Beam 13a shows the illumination of the mask 12 for an alternate position of the cathode ray beam. Thus the color of the light passing through slit 14 in mask 12 is determined by the signal applied to vertical deflection plates 20 from signal source 21. A cylindrical lens 16 has no effect upon the beam in the vertical direction. A film 17 located behind mask 12 is illuminated by the light passing through the slit 14. It is obvious that output means other than a film may be located behind mask 12, for example, a photocell might be used.

Figure 2:
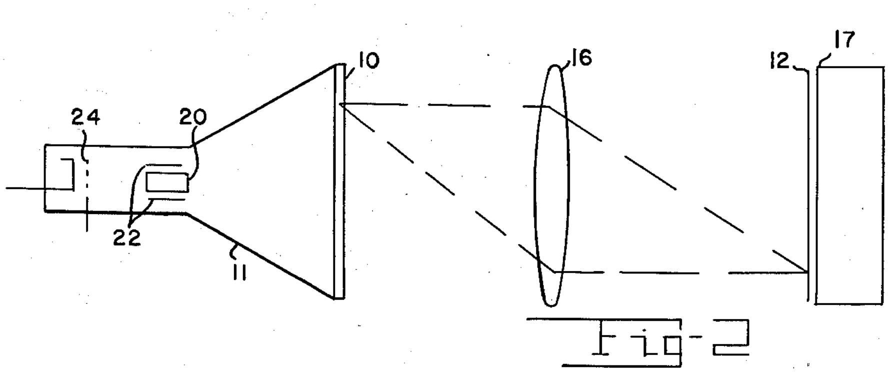
FIG. 2 shows the light pattern in the second of said two perpendicular directions.

In the horizontal direction lens 16 images the information from the face of cathode ray tube 11 upon the mask 12, as shown in FIG. 2, so that the horizontal information on the cathode ray tube is preserved on the film, whereas the vertical information is used to determine the color of the image. Therefore the signal applied to horizontal deflection plates 22 from signal source 23 determines the position of the spot of light on film 17. The radar video signal may also be applied to the control grid 24 as well as deflection plates 20 to give an intensity modulation together with the color modulation.

Figure 4:
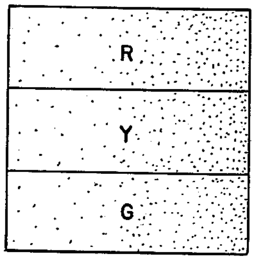
FIG. 4 shows a modification of the mask of FIG. 3, which may also be used with the device of FIG. 1.

As shown in FIG. 4 variations of the light intensity with spot position may be compensated for by modifying the mask 10 to provide a variable density filter as necessary in either direction of the variable color filters. This may be provided either by modifying color filter 10 shown in FIG. 3, or by the use of a separate intensity filter.

In one form, the color intensity mask can be of the type of two dimensional colors giving hue and saturation effects with intensity controlled by grid 24 and choice of color by signals applied to plates 20 and 22.

It is obvious that other signals than those described may be applied to the horizontal deflection plates 20 and the vertical deflection plates 22 and control grid 24.

Figure 5:
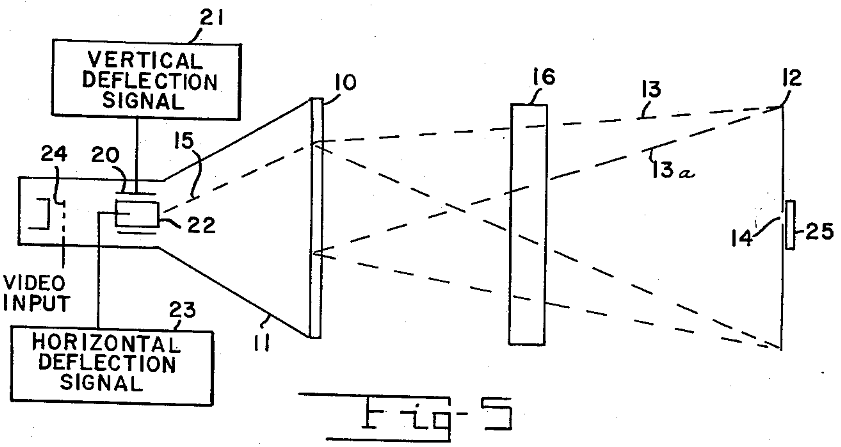
FIG. 5 shows a further embodiment of the invention with a diffusing medium located behind the slit.

The device of the invention may also be adapted for use as a variable color and intensity light source in the manner shown in FIG. 5. A diffusing screen 25 is located adjacent mask 12. Then by using the mask shown in FIG. 4 and by applying a color control signal to the vertical deflection plates 20 and an intensity control signal to the horizontal deflection plates 22, the light output at the diffusing surface will have a color and intensity as determined by the signals applied to the horizontal and vertical deflection plates of cathode ray tube 11. If a third signal is applied to grid 24 the output will be a light signal with an intensity proportional to the signal applied to grid 24, color and intensity modulated by the signals applied to the horizontal and vertical deflection plates of tube 11.

There is thus provided a device for producing light which varies in color and intensity as a function of the signal applied to the horizontal and vertical deflection plates of a cathode ray tube.

While certain specific embodiments have been described in some detail it is obvious that numerous changes may be made without departing from the general principles and scope of the invention.

I claim:

1. A variable color and intensity light source comprising; a cathode ray tube having a beam producing means and horizontal and vertical deflection means, a filter on the face of said cathode ray tube, said filter varying in colors in one direction and in intensity in the direction perpendicular to said one direction to thereby produce a light beam of color and intensity as determined by the position of the cathode ray beam on the face of the tube, a mask having an aperture therein located in said light beam, whereby only a portion of said light passes through said aperture, means for applying a color signal to the deflection means of said cathode ray tube in the direction of color variation on said filter and means for applying an intensity signal to the other deflection means of said cathode ray tube.

2. A device for providing color and intensity modulated light, comprising; a cathode ray tube having a beam producing means, a control electrode, horizontal deflection means, and vertical deflection means, a filter on the face of said cathode ray tube, said filter varying in colors in the vertical direction and in intensity in the horizontal direction to thereby produce a light beam of color and intensity as determined by the position of the cathode ray beam on the face of the tube, a mask having an aperture therein located in said light beam, whereby only a portion of said light passes through said aperture, means for applying a first signal to the control electrode of said cathode ray tube, means for applying a color signal to the vertical deflection means of said cathode ray tube, means for applying an intensity signal to the horizontal deflection means of said cathode ray tube, to thereby produce a light signal color and intensity modulated by said color signal and said intensity signal.

3. A device for providing color and intensity modulated light, comprising; a cathode ray tube having a beam producing means, a control electrode, horizontal deflection means, and vertical deflection means, a filter on the face of said cathode ray tube, said filter varying in colors in the vertical direction and in intensity in the horizontal direction to thereby produce a light beam of color and intensity as determined by the position of the cathode ray beam on the face of the tube, a mask having an aperture therein located in said light beam, whereby only a portion of said light passes through said aperture, a diffusing screen located behind said mask adjacent said aperture, means for applying a first signal to the control electrode of said cathode ray tube, means for applying a color signal to the vertical deflection means of said cathode ray tube, means for applying an intensity signal to the horizontal deflection means of said cathode ray tube, to thereby produce a light signal color and intensity modulated by said color signal and said intensity signal.

4. A device for varying the color and intensity of the light signal information applied to a film from a cathode ray tube having a beam producing means, a control grid, horizontal deflection means and vertical deflection means comprising; a filter on the face of said cathode ray tube, said filter varying in colors in one direction and in intensity in the direction perpendicular to said one direction to thereby produce a light beam of color and intensity as determined by the position of the cathode ray beam on the face of the tube, a mask having an aperture therein located in said light beam adjacent said film whereby only a portion of said light passes through said aperture, means for applying a color signal to the deflection means of said cathode ray beam in the direction of color variation on said filter and means for applying an intensity signal to the other deflection means of said cathode ray tube.

5. A device for varying the color and intensity of the light signal information applied to a film from a cathode ray tube having a beam producing means, a control grid, horizontal deflection means and vertical deflection means comprising; a filter on the face of said cathode ray tube, said filter varying in colors in one direction and in intensity in the direction perpendicular to said one direction to thereby produce a light beam of color and intensity as determined by the position of the cathode ray beam on the face of the tube, a mask having an aperture therein located in said light beam adjacent said film whereby only a portion of said light passes through said aperture, means for applying a color signal to the deflection means of said cathode ray beam in the direction of color variation on said filter, means for applying an information bearing signal to the other deflection means of said cathode ray tube, and means for applying an intensity control signal to the control grid of said cathode ray tube.

References Cited in the file of this patent

UNITED STATES PATENTS

| | | |
|---|---|---|
| 2,587,074 | Sziklai | Feb. 26, 1952 |
| 2,598,941 | Roth | June 3, 1952 |
| 2,600,868 | Hales | June 17, 1952 |
| 2,638,498 | France | May 12, 1953 |
| 2,691,162 | Geer | Oct. 5, 1954 |
| 2,733,632 | Pall | Feb. 7, 1956 |
| 2,761,089 | Haeff | Aug. 28, 1956 |
| 2,878,309 | Christensen | Mar. 17, 1959 |

FOREIGN PATENTS

| | | |
|---|---|---|
| 781,886 | Great Britain | Aug. 28, 1957 |